United States Patent
Kang et al.

(10) Patent No.: US 9,392,561 B2
(45) Date of Patent: Jul. 12, 2016

(54) UPLINK SIGNAL TRANSMISSION METHOD AND STATION DEVICE, AND UPLINK SIGNAL RECEIVING METHOD AND ACCESS POINT DEVICE

(71) Applicant: LG ELECTRONICS INC., Seoul (KR)

(72) Inventors: Jiwon Kang, Anyang-si (KR); Dongcheol Kim, Anyang-si (KR); Kyujin Park, Anyang-si (KR); Jiwoong Jang, Anyang-si (KR); Hangyu Cho, Anyang-si (KR); Sungho Park, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 14/387,163

(22) PCT Filed: Mar. 25, 2013

(86) PCT No.: PCT/KR2013/002461
§ 371 (c)(1),
(2) Date: Sep. 22, 2014

(87) PCT Pub. No.: WO2013/141672
PCT Pub. Date: Sep. 26, 2013

(65) Prior Publication Data
US 2015/0085836 A1    Mar. 26, 2015

Related U.S. Application Data

(60) Provisional application No. 61/614,529, filed on Mar. 23, 2012.

(51) Int. Cl.
*H04W 56/00* (2009.01)
*H04W 74/08* (2009.01)
*H04W 72/04* (2009.01)
*H04W 84/12* (2009.01)

(52) U.S. Cl.
CPC ........ *H04W 56/0005* (2013.01); *H04W 56/002* (2013.01); *H04W 72/04* (2013.01); *H04W 74/0808* (2013.01); *H04W 84/12* (2013.01)

(58) Field of Classification Search
None
See application file for complete search history.

(56) References Cited

U.S. PATENT DOCUMENTS

| 8,571,010 B1* | 10/2013 | Zhang | ............... | H04W 56/0005 370/230 |
| 2002/0061031 A1* | 5/2002 | Sugar | ............... | H04W 16/14 370/466 |

(Continued)

FOREIGN PATENT DOCUMENTS

| EP | 2234336 | 9/2010 |
| WO | 2010-079952 | 7/2010 |
| WO | 2012002758 | 1/2012 |

OTHER PUBLICATIONS

PCT International Application No. PCT/KR2013/002461, Written Opinion of the International Searching Authority dated Jun. 27, 2013, 1 page.

*Primary Examiner* — Hong Cho
(74) *Attorney, Agent, or Firm* — Lee, Hong, Degerman, Kang & Walmey; Jonathan Kang; Michael Monaco

(57) ABSTRACT

The present invention provides an uplink signal transmission method and apparatus. A method for transmitting an uplink signal to an access point (AP) by means of a station (STA) in a Wireless local area network (WLAN) system comprises: sensing a medium being occupied by another STA; and transmitting the uplink signal to the AP on the medium being occupied by another STA.

8 Claims, 12 Drawing Sheets

(56) References Cited

U.S. PATENT DOCUMENTS

| | | | |
|---|---|---|---|
| 2005/0180357 A1* | 8/2005 | Tao | H04W 74/0816 370/329 |
| 2006/0030362 A1* | 2/2006 | Fukuda | H04W 48/12 455/561 |
| 2006/0209771 A1* | 9/2006 | Shpak | H04W 74/0816 370/338 |
| 2008/0013522 A1 | 1/2008 | Benveniste | |
| 2009/0225717 A1 | 9/2009 | Banerjea | |
| 2013/0051358 A1* | 2/2013 | Turtinen | H04W 74/0816 370/330 |

\* cited by examiner 802.11 Components (a)

(b)

UPLINK SIGNAL TRANSMISSION METHOD AND STATION DEVICE, AND UPLINK SIGNAL RECEIVING METHOD AND ACCESS POINT DEVICE

CROSS-REFERENCE TO RELATED APPLICATIONS

This application is the National Stage filing under 35 U.S.C. 371 of International Application No. PCT/KR2013/002461, filed on Mar. 25, 2013, which claims the benefit of U.S. Provisional Application Ser. No. 61/614,529, filed on Mar. 23, 2012, the contents of which are all hereby incorporated by reference herein in their entirety.

TECHNICAL FIELD

The present invention relates to a wireless communication system and, more particularly, to a method and apparatus for transmitting an uplink signal and a method and apparatus for receiving an uplink signal in a wireless local area network (WLAN) system.

BACKGROUND ART

A communication scheme used in a communication system including a plurality of communication devices may be divided into contention based communication and non-contention based communication according to how communication resources are occupied or allocated by the communication devices. In the non-contention based communication scheme, an access point (AP) or a control node for controlling the AP allocates communication resources between the communication devices and the AP. In contrast, in contention based communication scheme, communication resources are occupied through contention between the communication devices which desire to access the AP.

Carrier Sense Multiple Access (CSMA)

CSMA is a contention based communication scheme and refers to a probabilistic media access control (MAC) protocol in which a node or a communication device verifies the absence of other traffic on the same shared transmission medium (also called a shared channel) before transmitting traffic on a shared transmission medium such as a frequency band. In CSMA, a transmitting device determines whether another transmission is in progress before initiating transmission of traffic to a receiving side. In other words, the transmitting device tries to detect the presence of a carrier from another transmitting device before attempting to transmit traffic. If the carrier is sensed, the transmitting device waits for transmission in progress by another transmitting device to finish before initiating transmission thereof. Consequently, CSMA is a communication scheme based on the principle of "sense before transmit" or "listen before talk".

Meanwhile, various radio communication technologies have developed along with advances in information communication technology. Among these, a WLAN is a radio frequency based technique for allowing a user to wirelessly access the Internet in a household, an office, or a specific service area by using a portable terminal such as a personal digital assistant (PDA), a laptop computer, a portable multimedia player (PMP), or a smartphone. Due to increase in the number of users and activation of high-capacity multimedia services, a method for increasing data throughput in a radio communication system is needed.

DETAILED DESCRIPTION OF THE INVENTION

Technical Problems

The present invention provides a method for increasing data throughput without expanding bandwidth in a CSMA based communication system.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting an uplink signal to an access point (AP) by a station (STA) in a wireless local area network (WLAN), including sensing a signal transmitted to the AP by another STA on a medium to sense that the medium is being occupied by the another STA; and transmitting the uplink signal to the AP on the medium currently occupied by the another STA.

In another aspect of the present invention, provided herein is a station (STA) for transmitting an uplink signal to an access point (AP) in a wireless local area network (WLAN), including a radio frequency (RF) unit and a processor configured to control the RF unit, wherein the processor is configured to sense, using the RF unit, that a medium is being occupied by another STA and the processor is configured to control the RF unit to transmit the uplink signal to the AP on the medium currently occupied by the another STA.

In another aspect of the present invention, provided herein is a method for receiving an uplink signal from a station (STA) by an access point (AP) in a wireless local area network (WLAN), including receiving a signal on a medium from another STA; and receiving the uplink signal from the STA on the medium on which the signal is being received from the another STA.

In another aspect of the present invention, provided herein is an access point (AP) for receiving an uplink signal from a station (STA) in a wireless local area network (WLAN), including a radio frequency (RF) unit and a processor configured to control the RF unit, wherein the processor receives the uplink signal on a medium on which the RF unit is receiving a signal from another STA.

In each aspect of the present invention, the STA may sense that the medium is being occupied by the another STA by sensing a signal transmitted by the another STA to the AP on the medium.

In each aspect of the present invention, the STA may acquire at least one of identifier information of the another STA, identifier information of the AP, a type of the signal, and time/frequency synchronization information, based on the sensed signal.

In each aspect of the present invention, the uplink signal may be transmitted to the AP on the medium occupied by the another STA using at least one of the identifier information of the another STA, the identifier information of the AP, the type of the signal, and the time/frequency synchronization information.

In each aspect of the present invention, the uplink signal may be received by the AP on the medium occupied by the another STA using at least one of the identifier information of the another STA, the identifier information of the AP, the type of the signal, and the time/frequency synchronization information.

In each aspect of the present invention, the uplink signal may be transmitted in synchronization with a frequency and a signal transmission timing of the another STA.

In each aspect of the present invention, the uplink signal may be transmitted on the medium currently occupied by the another STA when frequency synchronization of the STA is identical to frequency synchronization of the another STA.

In each aspect of the present invention, the uplink signal may be transmitted on the medium currently occupied by the another STA when the sensed signal is a request-to-send (RTS) packet of the another STA or is a data segment within a specific order among data segments of the another STA.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the embodiments of the present invention, uplink frequency synchronization can be efficiently performed in a CSMA based system.

According to the embodiments of the present invention, uplink MU-MIMO transmission can be efficiently performed.

According to the embodiments of the present invention, uplink data throughput can be improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
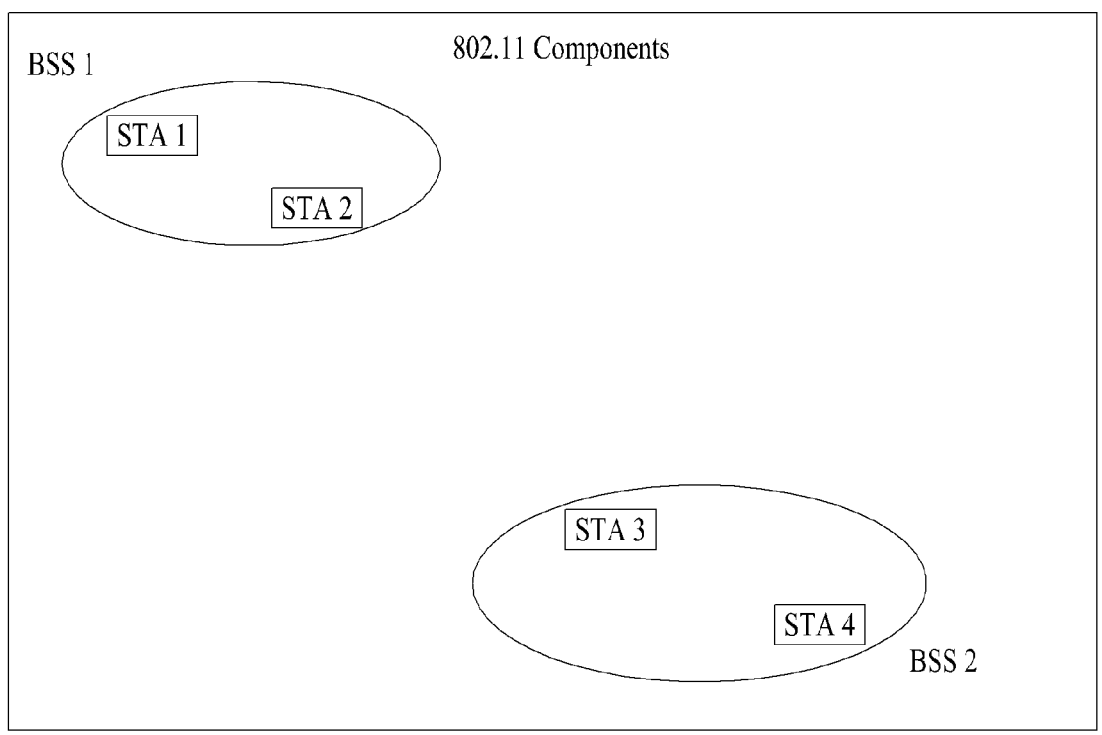
FIG. 1 is a diagram illustrating an exemplary structure of an IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments described hereinbelow are combinations of elements and features of the present invention in a predetermined format. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope of technical idea of the present invention.

In some instances, well-known structures and devices are omitted in order to avoid obscuring the concepts of the present invention or the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts which are not described to clarify the technical idea of the present invention, reference may be made to these documents. Further, all terms as set forth herein can be explained by the standard documents.

The following technologies may be applied to a variety of wireless radio access systems including a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, or evolved UTRA (E-UTRA). For clarity, although the following detailed description is given based on an IEEE 802.11 system, the technical idea of the present invention is not limited thereto.

Carrier Sense Multiple Access with Collision Detection (CSMA/CD)

CSMA/CD is a collision detection scheme in a wired LAN environment, in which a personal computer (PC) or a server which desires to communicate in an Ethernet environment confirms whether communication occurs on a network and, if another device transmit data on the network, the PC or server waits and then sends data. However, if two or more users (e.g. a PC, a terminal, etc.) simultaneously transmit data, collision occurs between simultaneous transmissions. CSMA/CD is a scheme for enabling flexible data transmission by monitoring such collision. For example, a transmitting device using CSMA/CD adjusts data transmission thereof by sensing data transmission performed by another transmitting device using the following rules.

<Rules>

X. If cable is idle, transmit.

Y. If cable is busy, continue to sense cable until cable enters standby state.

V. If collision is sensed during transmission, stop data transmission, send jamming signal, and then completely finish transmission.

W. Wait random time and then retry transmission starting from step X.

Carrier Sense Multiple Access with Collision Avoidance (CSMA/CA)

CSMA/CA is a MAC protocol specified in IEEE 802.11 standards. A WLAN system according to the IEEE 802.11 standards uses CA, that is, a collision avoidance scheme, instead of CSMA/CD used in IEEE 802.3 standards. Transmitting devices always sense a carrier of a network. If the network is empty, the transmitting devices wait a predetermined time according to locations thereof registered in a list and then transmit data. Various methods are used to determine priorities between the transmitting devices in the list and reconfigure the priorities. In a system according to some versions of the IEEE 802.11 standards, collision may occur and, in this case, a collision sensing procedure is performed. A transmitting device using CSMA/CA avoids collision between data transmission by another transmitting device and data transmission thereby, using the following rules.

<Rules> i) Transmitting device A performs carrier sensing for sensing whether another transmitting device is transmitting data (whether another transmitting device is transmitting wave).

ii) If that another transmitting device is transmitting data is sensed, then wait.

iii) Random time is allocated due to delay time up to transmission start.

iv) Carrier resensing is performed to check whether another carrier is absent.

v) Start data (packet) transmission.

Multiple Input Multiple Output (MIMO)

MIMO is technology for using multiple antennas both at a transmitting side and a receiving side and raising capacity or a signal to interference-plus-noise ratio (SINR) in proportion to the number of the used antennas. For reference, a scheme of using multiple antennas only at the transmitting side is called multiple input single output (MISO), a scheme of using multiple antennas only at the receiving side is called single input multiple output (SIMO), and a scheme of using a single antenna at both the transmitting side and the receiving side is called single input single output (SISO). The MIMO technology, nonetheless, is used to collectively refer to the MIMO, SIMO, MISO, and SISO schemes.

Meanwhile, the MIMO technology may be used for transmit diversity, beamforming, spatial multiplexing, etc. Transmit diversity is a technique for raising transmission reliability by transmitting the same data through a plurality of transmit antennas. Beamforming is used to increase an SINR of a signal by adding a weight according to a channel state in a plurality of antennas. The weight may be expressed as a weight vector or a weight matrix and this is referred to as a precoding vector or a precoding matrix. Spatial multiplexing is a technique capable of transmitting data at high rate without increasing bandwidth by simultaneously transmitting different data through a plurality of transmit antennas. Spatial multiplexing includes spatial multiplexing for a single user and spatial multiplexing for multiple users. Spatial multiplexing for a single user using MIMO is referred to as single user MIMO (SU-MIMO) and spatial multiplexing for multiple users using MIMO is referred to as spatial division multiple access (SDMA) or multiple user MIMO (MU-MIMO).

MU-MIMO will now be described in more detail. In the case of SU-MIMO, signals are transmitted from a single transmitting side to a single receiving side on the same time/frequency physical resource, whereas, in the case of MU-MIMO, signals are transmitted from a single transmitting side to a plurality of receiving sides or from a plurality of transmitting sides to a single receiving side on the same time/frequency physical resource by applying a spatial decomposition scheme. In MU-MIMO technology for transmitting signals from a single transmitting side to a plurality of receiving sides, it is important to transmit a signal to each receiving side in a state in which interference is eliminated as much as possible by using multiple antennas of the transmitting side. In MU-MIMO technology transmitting signals from a plurality of transmitting sides to a single receiving side, it is important for the receiving side to separate a signal of each transmitting side using multiple antennas. In terms of an AP and a terminal, MU-MIMO for transmitting signals from a single AP to a plurality of terminals using the same time/frequency resource is especially referred to as a downlink (DL) MU-MIMO and MU-MIMO for transmitting signals from a plurality of terminals to a single AP using the same time/frequency resource is especially referred to as uplink (UL) MU-MIMO. In UL MU-MIMO technology, since transmitting sides which are separated by different distances and have different hardware characteristics transmit signals to a single receiving side, a UL synchronization process (e.g. a process for adjusting a frequency offset and/or a UL transmission timing offset) between the transmitting sides is also very important.

In a current CSMA based system, UL MU-MIMO transmission is not considered. This is because, for UL MU-MIMO transmission, UL synchronization between heterogeneous devices should be performed but the CSMA based system is an unsynchronized system in terms of a network. In a cellular system, which is a synchronized system, a base station (BS) measures or calculates a UL frequency offset or timing offset of each terminal through a UL signal and then performs UL synchronization by providing the frequency offset and the timing offset to the terminal as control information. In contrast, the CSMA based system such as a local area network (LAN) or a personal area network (PAN), a receiver is only synchronized with a transmitting device by using a preamble signal of a transmission packet in terms of a link and synchronization between the receiver and the transmitting device is not performed in terms of a network, an AP, or a cell. In other words, in the CSMA based system, a side transmitting a signal only forces a side receiving a signal to be synchronized therewith and a powerful control entity such as a BS in a cellular system has no function for controlling frequency and timing offsets of each device in a network.

However, as a CSMA based network has evolved, the control function of an AP has been gradually increased. For example, in IEEE 802.11ac, DL MU-MIMO transmission is supported under control of the AP. Accordingly, in an evolved system, UL MU-MIMO may also be considered.

In the cellular system, UL MU-MIMO transmission is generally subjected to the following processes.

Step 1. A BS selects a terminal group which is to perform UL MU-MIMO.

Step 2. The BS schedules time, frequency, and spatial resources (e.g. a precoding matrix) on which UL transmission is to be performed to each terminal belonging to the terminal group.

Step 3. Each terminal in the terminal group performs UL transmission through a physical resource determined by UL scheduling information.

In this way, in an existing UL MU-MIMO transmission scheme, the BS controls a device pair (or group), which is to perform MU-MIMO, and a physical resource and the terminal performs UL transmission using a passively scheduled resource. Accordingly, in most cases, the terminal receiving a command for UL transmission cannot know and does not need to know whether UL transmission performed thereby is UL MU-MIMO transmission or SU MIMO transmission and with which terminals the terminal is paired (or grouped). However, in order to perform UL MU-MIMO transmission according to the existing scheme in the CSMA based system, an AP should perform scheduling for UL transmission. This is because, for UL MU-MIMO transmission, packets transmitted by a plurality of devices should be simultaneously received by the AP and at the same frequency. In other words, for UL MU-MIMO transmission, a frame transmission timing and a frequency of each device should be synchronized. In the CSMA based system, for time and frequency synchronization of each device, a scheme may be considered in which the AP, which is a receiver, measures a transmission timing offset and a frequency offset of transmitting devices and informs each transmitting device of the measured values so that each transmitting device compensates for the transmission timing and frequency offsets according to the measured values, as in the exiting scheme. However, in order to perform this scheme, the AP needs to transmit a packet containing control information for time and frequency synchronization to each device regularly or prior to MU-MIMO transmission. This may lead to increase of overhead of the CSMA based system. In addition, the CSMA scheme is a scheme in which one transmitting device exclusively uses one medium at a specific timing and even if other devices desire to transmit a packet when such a channel is exclusively occupied, transmission should be delayed (CSMA/CA) or retransmission should be performed due to collision between packets (CSMA/CD). Therefore, in the case in which one control packet is further transmitted for time/frequency synchronization, performance deterioration affecting other devices is much severer than another scheduling based TDMA or FDMA scheme. Moreover, if a scheduling function is added to the AP, complexity of the AP is increased. Hence, in the CSMA based system, system efficiency deterioration caused by frequent transmission of a control packet for UL MU-MIMO transmission may become serious.

In order to solve the above problems, the present invention proposes a sensing based frequency synchronization scheme. Prior to description of embodiments of the present invention, a CSMA based system to which the embodiments of the present invention may be applied will be described in more detail focusing on an IEEE 802.11 system for example. For convenience, the IEEE 802.11 system is described as an example of the CSMA based system. However, the embodiments of the present invention may be applied to other CSMA based systems.

FIG. 1 is a diagram illustrating an exemplary structure of an IEEE 802.11 system to which the present invention is applicable.

The structure of the IEEE 802.11 system may include a plurality of components. A WLAN which supports transparent mobility of a station (STA) with respect to a higher layer by mutual operations of the components may be provided. In a WLAN system, the STA is a device operating according to MAC layer/physical layer (MAC/PHY) regulation of IEEE 802.11. The STA includes an AP STA and a non-STA. The non-AP STA is a device directly handled by users, such as a laptop computer and a mobile phone.

Referring to FIG. 1, a basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). Ellipses indicating the BSSs in FIG. 1 may be understood as coverage areas in which STAs included in a corresponding BSS maintain communication. Each of these areas may be referred to as basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a LAN may be configured as necessary instead of being prescheduled, which is called an ad-hoc network.

The membership of STAs in the BSS may be dynamically changed when STAs enter an on or off state or STAs enter or leave a region of the BSS. To become a member of the BSS, an STA may use a synchronization process to join the BSS. To access all services of a BSS infrastructure, the STA should be associated with the BSS. Such association may be dynamically configured and may include use of a distributed system service (DSS).

Figure 2:
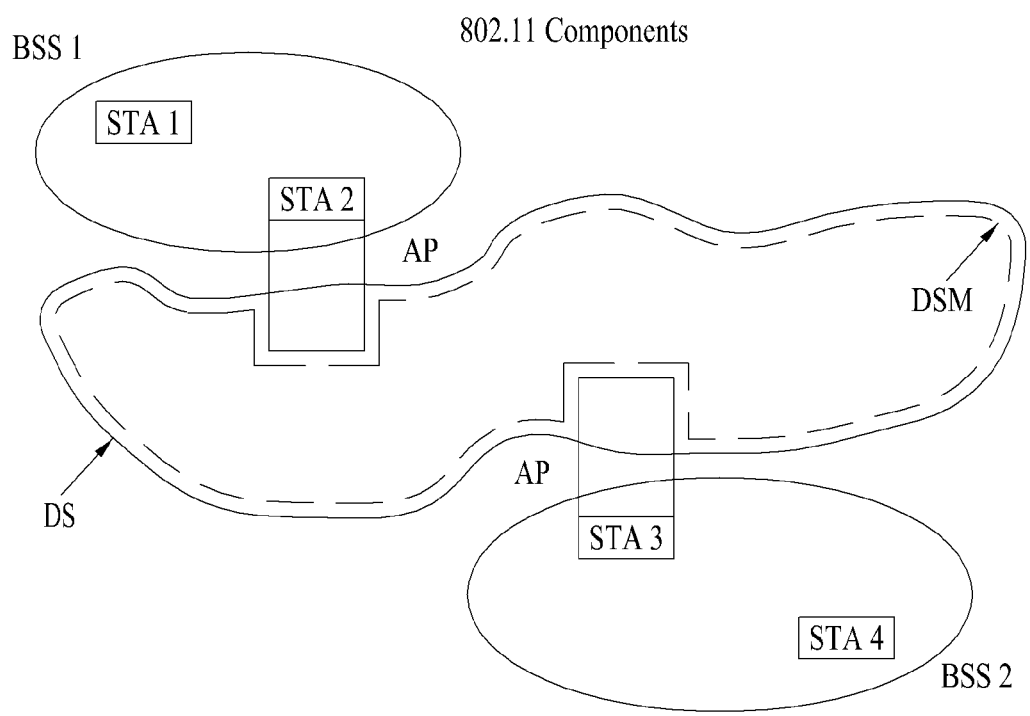
FIG. 2 is a diagram illustrating another exemplary structure of an IEEE 802.11 system to which the present invention is applicable.

FIG. 2 is a diagram illustrating another exemplary structure of an IEEE 802.11 system to which the present invention is applicable. In FIG. 2, components such as a distribution system (DS), a distribution system medium (DSM), and an AP are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by characteristics of the DSM. In relation to this, a wireless medium (WM) and the DSM are logically distinguished in IEEE 802.11 standards. Respective logical media are used for different purposes and are used by different components. In definition of IEEE 802.11 standards, such media are restricted to neither equal nor different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for managing an address of a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
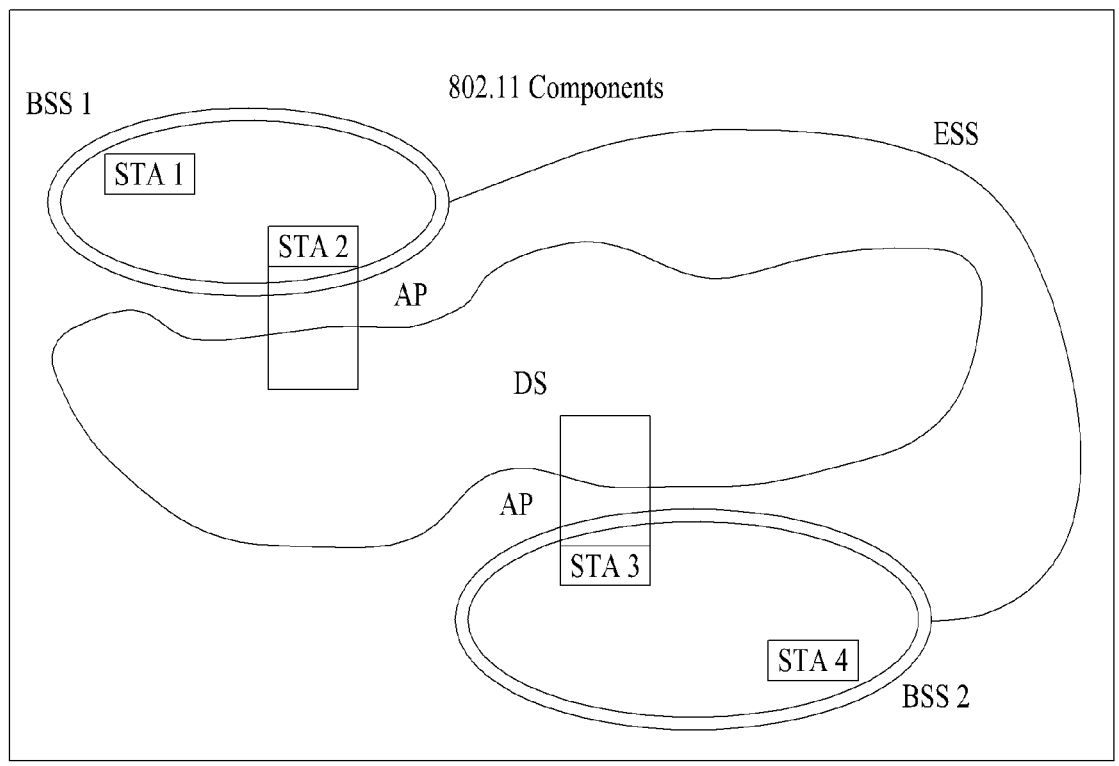
FIG. 3 is a diagram illustrating still another exemplary structure of an IEEE 802.11 system to which the present invention is applicable.

FIG. 3 is a diagram illustrating still another exemplary structure of an IEEE 802.11 system to which the present invention is applicable. In addition to the structure of FIG. 2, FIG. 3 conceptually illustrates an extended service set (ESS) for providing wide coverage.

A wireless network having arbitrary size and complexity may be comprised of a DS and BSSs. In the IEEE 802.11 system, such a network is referred to an ESS network. The ESS may correspond to a set of BSSs connected to one DS. However, the ESS does not include the DS. The ESS network characteristically appears as an IBSS network in a logical link control (LLC) layer. STAs included in the ESS may communicate with each other and mobile STAs are movable transparently with respect to the LLC layer from one BSS to another BSS (within the same ESS).

Nothing is assumed in IEEE 802.11 in relation to relative physical locations of the BSSs in FIG. 3 and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS network may be physically located in the same space as one (or more than one) ESS network. This may correspond to an ESS network form in the case in which an ad-hoc network operates in a location in which an ESS network is present, the case in which physically overlapping IEEE 802.11 networks are configured by different organizations, or the case in which two or more different access and security policies are necessary in the same location.

Figure 4:
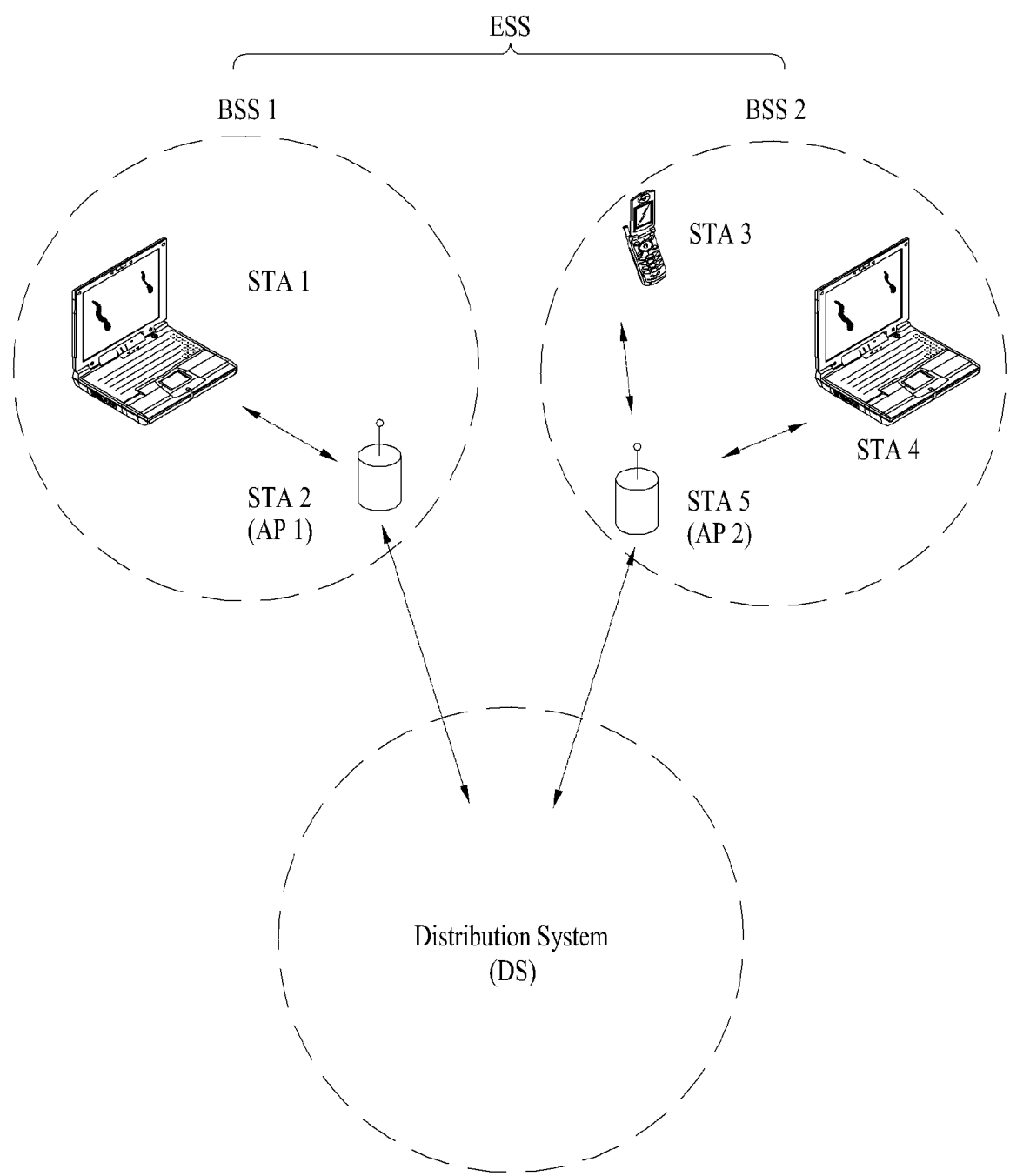
FIG. 4 is a diagram illustrating an exemplary structure of a WLAN system.

FIG. 4 is a diagram illustrating an exemplary structure of a WLAN system. In FIG. 4, an example of an infrastructure BSS including a DS is shown.

In the example of FIG. 4, BSS1 and BSS2 constitute an ESS. In FIG. 4, STA1, STA3, and STA4 correspond to non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal (MT), or a mobile subscriber station (MSS). An AP may correspond to a base station (BS), a Node-B, an evolved Node-B (eNB), a base transceiver system (BTS), a femto BS, or a pico BS, in other wireless communication fields.

In a WLAN system based on IEEE 802.11, a basic access mechanism of MAC is a CSMA/CA mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may perform clear channel assessment (CCA) for sensing a wireless channel or a medium during a predetermined time duration (e.g. DCF interframe space (DIFS)) before starting transmission. As a result of sensing, if it is determined that the medium is in an idle state, the AP and/or the STA starts frame transmission using the medium. Meanwhile, if it is sensed that the medium is in an occupied state, the AP and/or the STA does not start transmission thereof and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving quality of service (QoS) of a WLAN. In the HCF, QoS data may be transmitted in both a contention period (CP) and a contention-free period (CFP).

Figure 5:
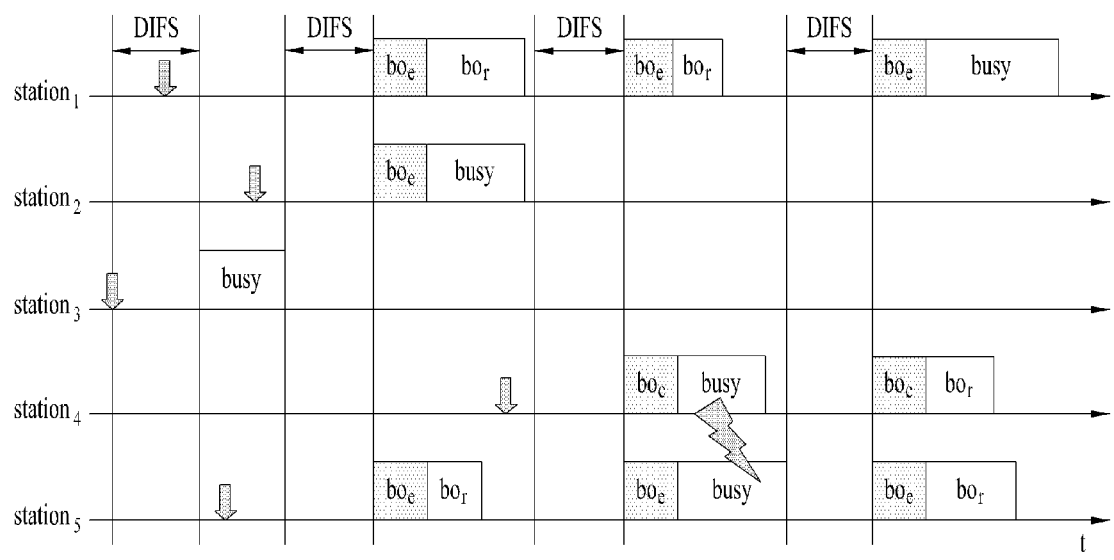
FIG. 5 is a diagram for explaining a backoff procedure.

FIG. 5 is a diagram for explaining a backoff procedure.

Operations based on a random backoff period will now be described with reference to FIG. 5. If a medium of an occupied or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to a value of 0 to CW. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. For example, CW, CWmin, and CWmax may be set to $2^n-1$ (where n=0, 1, 2, . . . ).

If the random backoff process is started, the STA continuously monitors the medium while counting down a backoff slot in response to the determined backoff count value. If the medium is monitored as the occupied state, the countdown stops and waits for a predetermined time. If the medium is in the idle status, the remaining countdown restarts.

As shown in the example of FIG. 5, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each of STA1, STA2, and STA5 waits for the DIFS time and then may perform countdown of the backoff slot in response to a random backoff count value selected thereby. The example of FIG. 5 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a DIFS time and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 5 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may double the CW value, select a random backoff count value, and then perform countdown. Meanwhile, STA1 may enter a standby state while the medium is in the occupied state due to transmission of STA4 and STA5. If the medium is in the idle state, STA1 may wait for the DIFS time and then start frame transmission after lapse of the residual backoff time.

As described above, the CSMA/CA mechanism includes not only a physical carrier sensing mechanism in which the AP and/or an STA directly sense a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate, to another AP and/or STA, a time remaining until an AP and/or an STA, which is currently using the medium or has authority to use the medium, enters an available state. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, the NAV may be set according to the value of a "duration" field of a MAC header of a frame.

A robust collision detection mechanism has been proposed to reduce the probability of collision. This will be described with reference to FIGS. 6 and 7. Although an actual carrier sensing range is different from a transmission range, it is assumed that the actual carrier sensing range is identical to the transmission range for convenience of description.

Figure 6:
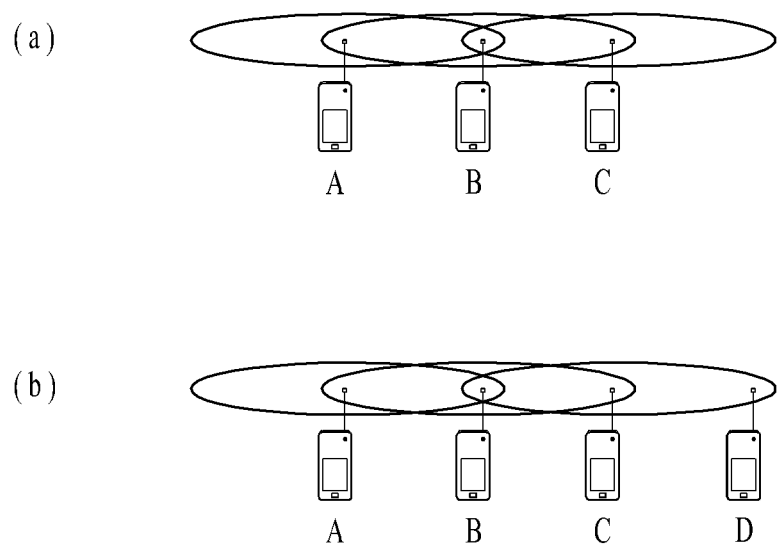
FIG. 6 is a diagram for explaining a hidden node and an exposed node.

FIG. 6 is a diagram for explaining a hidden node and an exposed node.

FIG. 6(a) exemplarily shows a hidden node. In FIG. 6(a), STA A is communicating with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in collision. Here, STA A may be considered a hidden node of STA C.

FIG. 6(b) exemplarily shows an exposed node. In FIG. 6(b), in a situation in which STA B is transmitting data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 7:
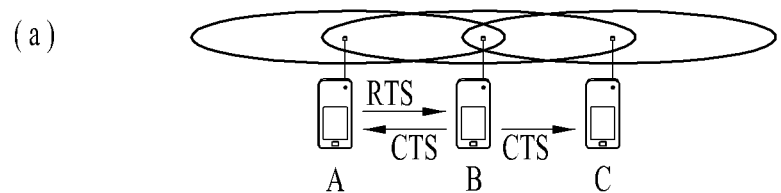
FIG. 7 is a diagram for explaining request-to-send (RTS) and clear-to-send (CTS).
Figure 7:
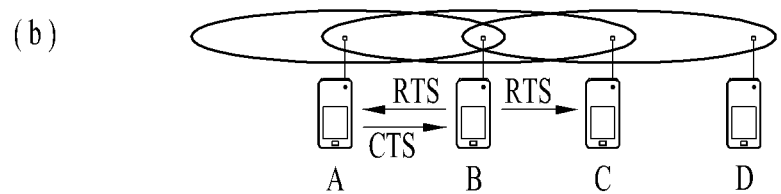

FIG. 7 is a diagram for explaining request-to-send (RTS) and clear-to-send (CTS).

To efficiently utilize a collision avoidance mechanism under the above-mentioned situation of FIG. 6, it is possible to use a short signaling packet such as RTS and CTS. RTS/CTS between two STAs may be overheard by neighboring STA(s), so that the neighboring STA(s) may consider whether information is transmitted between the two STAs. For example, if an STA to be used for data transmission transmits an RTS frame to an STA receiving data, the STA receiving data may inform neighboring STAs that the STA will receive data by transmitting a CTS frame to the neighboring STAs. Tables 1 and 2 shows an RTS frame format and a CTS frame format, respectively.

TABLE 1

| Frame Control | Duration | Receiver Address | Transmitter Address | FCS |
| --- | --- | --- | --- | --- |

TABLE 2

| Frame Control | Duration | Receiver Address | FCS |
| --- | --- | --- | --- |

Each of the RTS frame and the CTS frame are defined as a MAC frame format and a sort of a control frame. The MAC frame is basically composed of a MAC header, a frame body, and a frame check sequence (FCS) but the RTS frame format and the CTS frame format are composed of only the MAC header and the FCS without the frame body. In Table 1, Frame Control, Duration, Receiver Address, and Transmitter Address fields correspond to the MAC header. In Table 2, Frame Control, Duration, and Receiver Address fields correspond to the MAC header. In Tables 1 and 2, the Frame Control field may contain control information necessary for frame transmission/reception. The Duration field may be set to time for transmitting the corresponding frame etc. and may be used for NAV configuration of other STAs. In Table 1, the Receiver Address field corresponds to an address of an STA receiving the RTS frame and the Transmitter Address field corresponds to an address of an STA transmitting the RTS frame. In Table 2, the Receiver Address field corresponds to an address of an STA receiving the CTS frame. In Tables 1 and 2, an FCS field is a field for detecting an error of a corresponding frame.

The Frame Control field may be composed of a Protocol Version field, a Type field, a Subtype field, a To DS field, a From DS field, a More Fragment (MF) field, a Retry field, a Power Management (PM) field, a More Data (MD) field, a Protected Frame (PF) field, and an Order field.

FIG. 7(a) exemplarily shows a method for solving problems of a hidden node. In FIG. 7(a), it is assumed that both STA A and STA C are ready to transmit data to STA B. If STA A transmits RTS to STA B, STA B transmits CTS to each of STA A and STA C located in the vicinity thereof. As a result, STA C waits for a predetermined time until STA A and STA B stop data transmission, thereby avoiding collision.

FIG. 7(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all neighboring STAs and only STA A having data to be actually transmitted may transmit CTS. STA C receives only the RTS and does not receive the CTS of STA A, so that it can be recognized that STA A is located outside of the carrier sensing range of STA C.

As technical standards relatively recently established to overcome limitations of communication speed in a WLAN, there is IEEE 802.11n. IEEE 802.11n is aimed at increasing the speed of a network and extending an operation distance of a radio network. More specifically, IEEE 802.11n is based on MIMO technology to support high throughput (HT) of up to 540 Mbp. The MIMO technology uses multiple antennas in both a transmitting device and a receiving device so as to minimize transmission errors and optimize data rates.

As the WLAN widely spreads and applications based on the WLAN is diversified, necessity of new WLAN systems for supporting higher throughput than throughput supported by IEEE 802.11n has recently emerged. A next generation WLAN system supporting very high throughput (VHT) is a subsequent version of an IEEE 802.11n WLAN system (e.g. IEEE 802.11ac) and is one of IEEE 802.11 WLAN systems recently newly proposed to support data throughput of 1 Gbps or more in a MAC service access point (SAP).

The next generation WLAN system supports MU-MIMO transmission that enables a plurality of STAs to simultaneously access a channel in order to efficiently use a radio medium. According to the MU-MIMO transmission scheme, an AP may simultaneously transmit packets to one or more MIMO-paired STAs. In other words, the next generation WLAN system considers support of DL MU-MIMO. For reference, in an IEEE 802.11 system, DL MU-MIMO refers to a scheme in which an AP having more than one antenna transmits a physical layer protocol data unit (PPDU) to a plurality of non-AP STAs through the same radio frequency and the respective non-AP STAs simultaneously receive one or more distinct space-time streams. Current IEEE 802.11 standards consider characteristics of a CSMA scheme to support only DL MU-MIMO and do not consider UL MU-MIMO support. However, if UL MU-MIMO is supported in a CSMA based system, UL data throughput in the WLAN system will be able to be increased. Hence, the present invention proposes a sensing based UL MU-MIMO transmission scheme and a frequency synchronization scheme in order to support UL MU-MIMO in the CSMA based system. Hereinafter, a channel, a physical resource, a medium for transmission/reception of a packet or a signal will be referred to as a medium.

Figure 8:
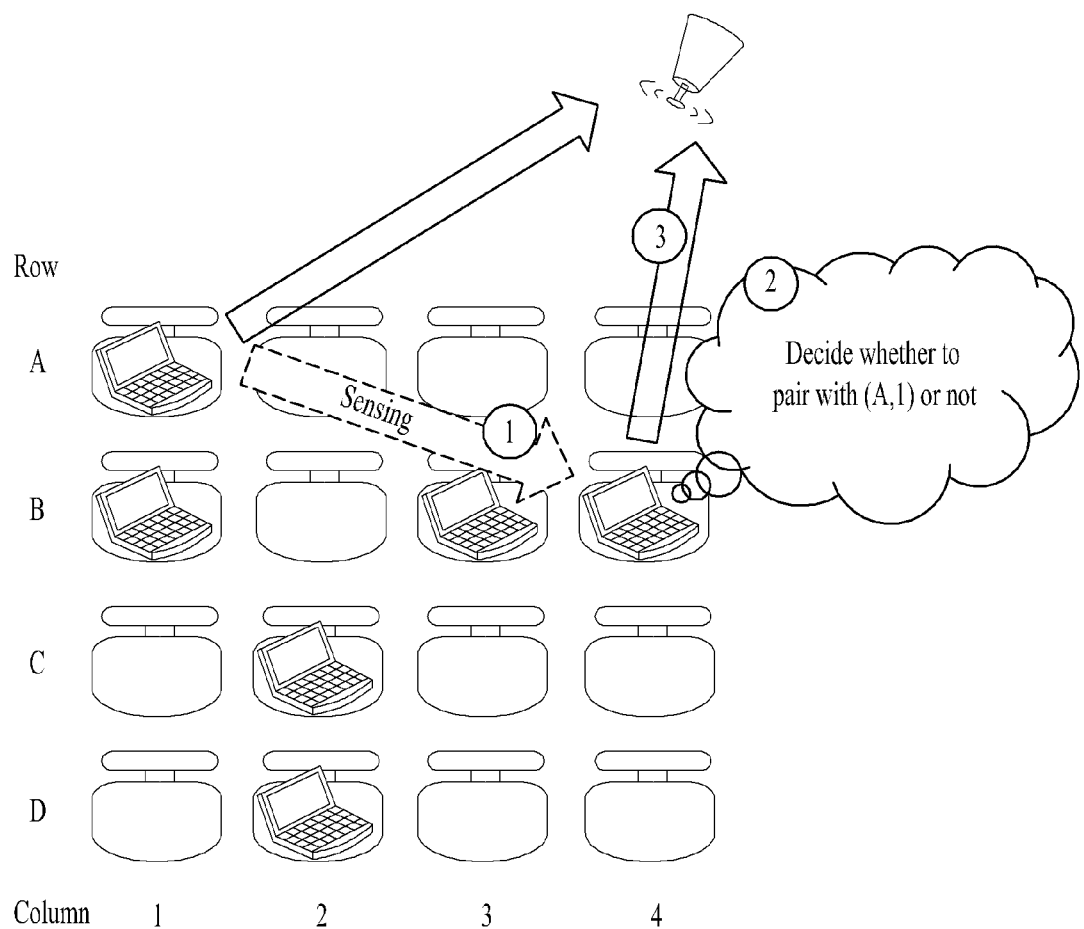
FIG. 8 illustrates sensing based UL MU-MIMO transmission according to an embodiment of the present invention.

FIG. 8 illustrates sensing based UL MU-MIMO transmission according to an embodiment of the present invention.

A device according to an embodiment of the present invention may perform UL MU-MIMO transmission according to the following rules.

<Rules>

X. Determine whether a terminal which is currently occupying a medium is capable of performing UL MU-MIMO transmission therewith by sensing the medium.

Y. If the terminal occupying the medium is not capable of performing UL MU-MIMO transmission, wait until the medium is empty. Otherwise, join the medium to perform UL MU-MIMO transmission.

In UL transmission according to the above <Rules>, a transmitting device itself senses and determines whether UL MU-MIMO transmission can be performed as opposed to a conventional UL MU-MIMO scheme in which a BS, which is a receiving device, schedules UL MU-MIMO. Referring to FIG. 8, for example, when a terminal present at location (A, 1) (hereinafter, device 1) transmits a signal to an AP, a terminal present at location (B, 4) (hereinafter, device 2) may:

(1) sense the signal transmitted by device 1, (2) determine whether UL MU-MIMO transmission with device 1 can be performed, that is, whether to pair device 1, and (3) perform MIMO transmission by joining a medium occupied by device 1 when it is determined that UL MU-MIMO transmission with device 1 can be performed.

In process (1), a signal sensed by device 2 may differ according to a system. In most CSMA based systems, since a packet header includes identifiers (IDs) (or addresses) of a transmitting device and a receiving device, a terminal which desires to join a medium occupied by another terminal may be aware of which terminal transmits a signal to which terminal by receiving the packet header. In addition, a type of a packet may be detected through the packet header. In addition, at the same time with reception of a packet, time/frequency synchronization information (e.g. frequency offset) of a transmitting device transmitting the packet may also be obtained through the packet header. That is, one or more among the following information may be acquired through the sensing procedure.

a. transmitting device ID
b. receiving device ID
c. type or use of packet
d. time/frequency synchronization information Meanwhile, in process (2), a device autonomously determines whether to join the medium for UL MU-MIMO transmission using the information obtained in process (1) (e.g. at least one of "a" to "d"). That is, referring to FIG. 8, device 2 of location (B, 4) may obtain at least one of "a" to "d" from the packet transmitted by device 1 of location (A, 1) and determine whether to pair with device 1 using the obtained information. Such determination may be performed with various criteria according to a system.

In process (3), a device which desires to join the medium adjusts packet transmission timing and frequency synchronization thereof with packet transmission timing and frequency synchronization of a device which has occupied the medium first, thereby transmitting a packet or signal thereof. For example, referring to FIG. 8, device 2 of location (B, 4) may adjust packet transmission timing and frequency synchronization thereof with packet transmission timing and frequency synchronization of device 1 of location (A, 1) and transmit a packet or signal thereof.

Figure 9:
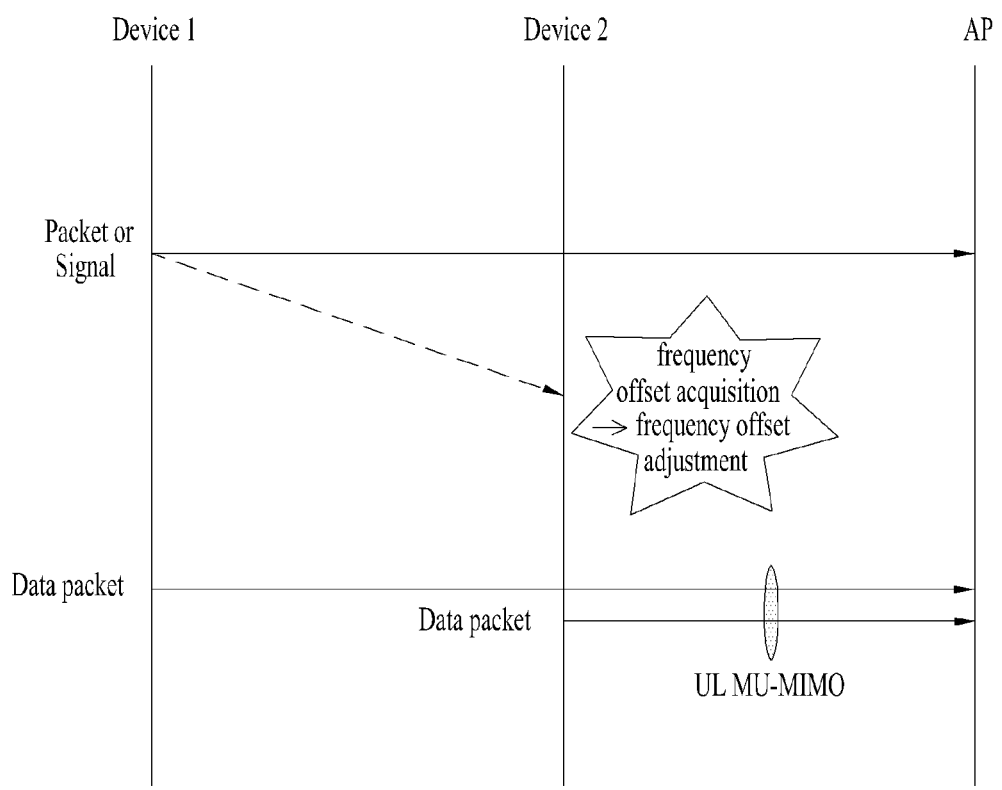
FIG. 9 illustrates a sensing based frequency synchronization scheme according to an embodiment of the present invention.

FIG. 9 illustrates a sensing based frequency synchronization scheme according to an embodiment of the present invention.

Frequency synchronization out of time synchronization and frequency synchronization may be performed according to a sensing based frequency synchronization scheme. Referring to FIG. 9, in a sensing based frequency (or carrier) synchronization scheme according to an embodiment of the present invention, when a specific device (hereinafter, device 1) is transmitting a packet or signal, another device (hereinafter, device 2) which is to perform transmission through the same medium together with device 1 listens or overhears the packet or signal, acquires a frequency offset of device 1 from the packet or signal, and adjusts frequency characteristics thereof with the frequency offset of the device 1. After adjusting frequency characteristics of device 2 with frequency characteristics of device 1, device 2 transmits a data packet of signal thereof on a medium on which device 1 transmits a data packet or signal.

Time synchronization and/or frequency synchronization between devices may be performed according to a scheme other than the embodiment of FIG. 9. For example, information necessary when device 2 performs time synchronization and frequency synchronization with device 1 may be provided by a BS or AP as control information or may be preset in a system. As an example, information about time synchronization and frequency synchronization may be preset in the system by prestoring a frequency offset and/or a packet transmission timing value obtained while devices in a fixed-type network exchange signals or packets in an installation procedure or an initial setup procedure in the fixed-type network. In this case, the fixed-type network is a network in which locations of devices therein are fixed during a predetermined time.

Generally, a transmission timing offset means an absolute transmission timing offset considering only a propagation delay between an AP and a corresponding device. However, in the embodiments of the present invention, the transmission timing offset may mean a relative transmission timing offset to another device in an MU group rather than the absolute transmission timing offset. For example, let's assume that a terminal of location (A, 1) in FIG. 8 is device 1, a terminal of location (B, 4) is device 2, an AP is device 3, and a propagation delay between devices "x" and "y" is $d_{xy}$. According to a scheme in which the transmission timing offset means the absolute transmission timing offset, $d_{13}$ and $d_{23}$ are provided to device 1 and device 2, respectively, so that device 1 is controlled to transmit a signal in advance by $d_{13}$ and device 2 is controlled to transmit a signal in advance by $d_{23}$. According to a scheme in which the transmission timing offset means the relative transmission timing offset, device 1 which has first occupied a medium may transmit a packet without compensating for the transmission timing offset and device 2 which desires to simultaneously transmit a packet on the medium which has been occupied by device 1 may transmit the packet by compensating for a relative propagation delay difference ($d_{23}-d_{13}$) to device 1. That is, device 2 transmits the packet in advance by "$d_{23}-d_{13}$" so that a time when the packet of device 1 reaches device 3 is synchronized with a time when the packet of device 2 reaches device 3. According to an embodiment in which the transmission timing offset means the relative transmission timing offset, the transmission timing offset may differ according to with which device 2 is paired to perform UL MU-MIMO transmission even when locations of device 2 and the AP are fixed.

In the sensing based frequency synchronization scheme of the present invention, various methods may be used to determine with which device(s) are to adjust frequency characteristics. As described above, based on a device which has first occupied a medium, other device(s) which desire to perform UL MU-MIMO transmission together with the device may be configured to adjust frequency characteristics thereof with frequency characteristics of the device, without designating a representative device. Alternatively, for example, the representative device may be designated from a group of devices which are to perform UL MU-MIMO transmission and other device(s) may be configured to adjust frequency characteristics based on the representative device. Alternatively. UL MU-MIMO transmission may be limitedly permitted only when frequencies are synchronized. For example, in process (1), when device 2 determines whether a terminal currently occupying a medium can perform UL MU-MIMO transmission therewith by sensing the medium, device 2 may consider whether frequency synchronization of device 2 is equal to frequency synchronization of the terminal Device 2 may determine that transmission of a packet or signal thereof is permitted on a medium occupied by a terminal, frequency synchronization of which is equal to frequency synchronization thereof.

Meanwhile, when a UL packet timing can be synchronized based on a specific reference packet from an AP, that is, when all devices are synchronized by an absolute transmission timing offset, a timing offset of each device may be determined regardless of MU grouping (i.e. MU pairing). For example, IEEE 802.11 defines, as one of management frames, a periodically transmitted beacon frame so as to indicate the presence of a radio network and to cause an STA performing scanning to search for the radio network and participate in the radio network. Device(s) which desire to perform UL transmission may use the beacon frame or a beacon in the beacon frame as reference for synchronization of a UL packet timing In the above-described embodiments of the present invention, when device 2 starts UL MU-MIMO transmission by carrying a packet thereof on a medium occupied by device 1, device 2 may inform an AP that device 2 is transmitting or will transmit the packet by joining the medium occupied by device 1. For example, device 2 may transmit a control packet indicating that device 2 is to join the medium or may transmit a message or a signal indicating that device 2 is joining the medium at a location regulated in a MAC or PHY header of the transmitting packet. Device 2 may participate in UL MU-MIMO transmission immediately after transmitting the control packet to the AP. However, as another embodiment, device 2 may participate in UL MU-MIMO transmission only when the AP permits device 2 to perform transmission. In the embodiment in which device 2 requires transmission permission for UL MU-MIMO transmission, information necessary for time/frequency synchronization may be further provided to device 2 in addition to the above transmission permission.

Instead of informing the AP of intention to perform UL MU-MIMO transmission, the AP may monitor whether another packet paired with a specific packet is transmitted thereto upon receiving a specific packet so that the AP may autonomously determine whether UL MU-MIMO transmission is being performed even though device 2 does not inform the AP of related information.

In addition, device 2 may inform device 1 currently occupying a medium (i.e. an MU grouped device) as to whether UL MU-MIMO transmission is performed (started). Information as to whether UL MU-MIMO transmission is performed (started) may serve to simply provide information but may be provided to request device 1 to permit transmission. In the latter case, upon receiving transmission permission from device 1, device 2 performs UL transmission on the medium. Device 1 may provide device 2 with information necessary when device 2 adjusts time/frequency synchronization therewith together with transmission permission. In other words, device 2 may request device 1 to permit UL MU-MIMO transmission and may receive permission about UL MU-MIMO transmission and/or information necessary for time/frequency synchronization from device 1, prior to start of UL MU-MIMO transmission.

Meanwhile, in the case of a fixed network in which devices in the network are fixed (during a prescribed time or more), once a group of devices for performing UL MU-MIMO transmission is determined, it does not matter if device grouping information is fixed during a next predetermined time. Accordingly, if the network provides the grouping information to devices, a device which desires to perform UL MU-MIMO transmission may confirm whether a transmitting device ID is present in a group capable of performing UL MU-MIMO transmission together therewith (hereinafter, an MU group) through a sensing procedure and perform UL MU-MIMO transmission only when it is confirmed that a device in the same MU group is transmitting a packet to the AP. That is, when the following conditions are satisfied, a device may perform UL transmission by joining a medium occupied by another device.

Condition A. transmitting device ID∈MU group
    Condition B. receiving device ID∈ID of target AP However, even when Conditions A and B are satisfied, if a corresponding device is already finishing data packet transmission, it may be difficult to participate in transmission. Therefore, a condition indicating that joining is permitted only when a sensed packet is a specific packet type may be added.

Figure 10:
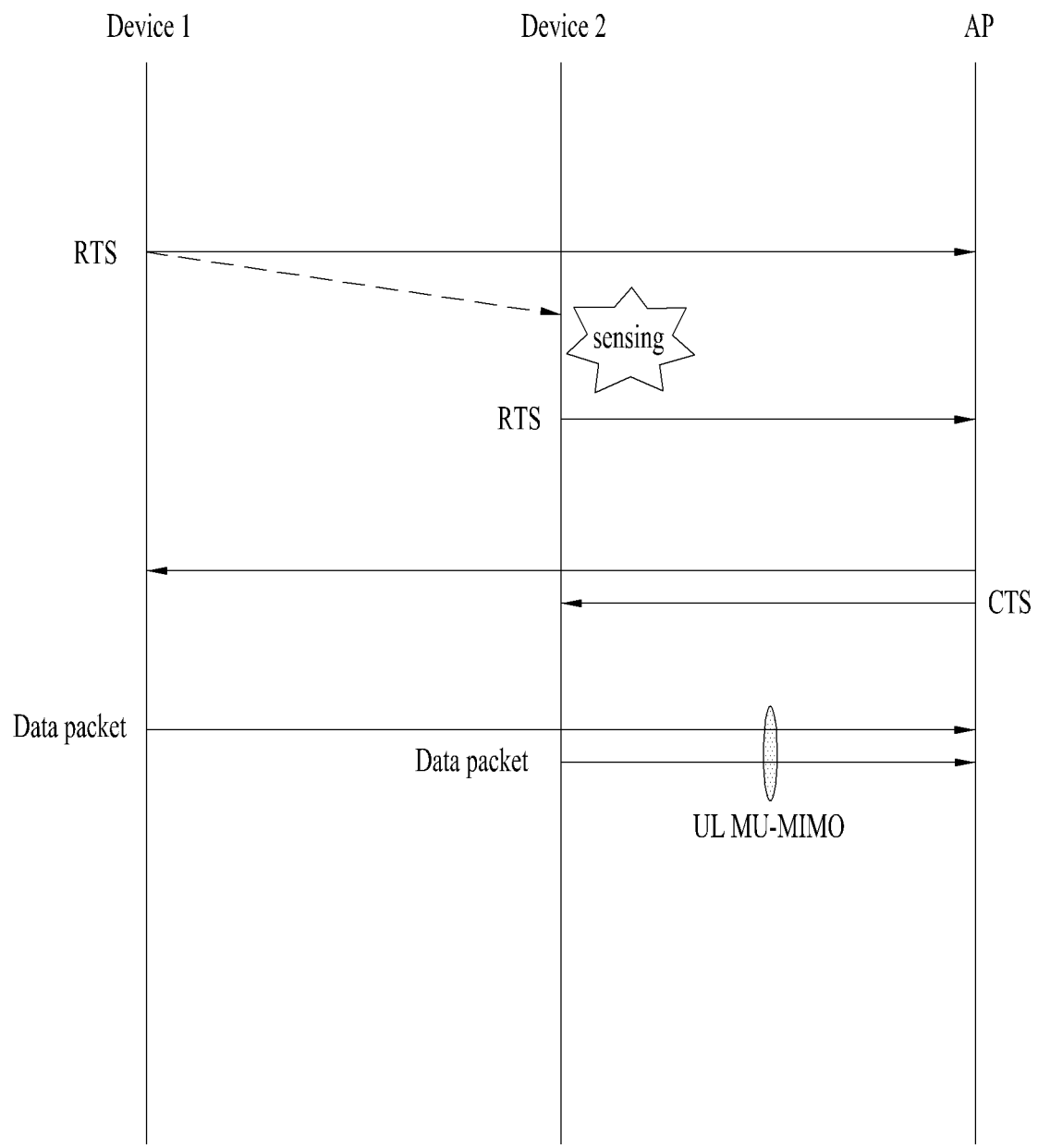
FIG. 10 illustrates sensing based MU-MIMO transmission according to another embodiment of the present invention.

FIG. 10 illustrates sensing based MU-MIMO transmission according to another embodiment of the present invention. Particularly, FIG. 10 illustrates an example of RTS packet sensing based UL MU-MIMO transmission.

For example, in IEEE 802.11, an RTS packet and a CTS packet are exchanged between a device and an AP in order to prevent a hidden node problem prior to data packet transmission as described with reference to FIG. 7. In this case, it may be regulated that joining for UL MU-MIMO transmission is permitted only when the RTS packet is sensed.

Referring to FIG. 10, upon sensing an RTS packet of device 1 belonging to an MU group, device 2 also transmits an RTS packet to an AP. A BS or the AP, which has (sequentially) received the RTS packets from device 1 and device 2, transmits a CTS packet to device 1 and device 2. An RTS/CTS exchange scheme for sensing based UL MU-MIMO transmission of the present invention is different from an RTS/CTS exchange scheme defined in legacy IEEE 802.11 standards, described in FIG. 7. Accordingly, in order to apply the present invention to an IEEE 802.11 system, an interval for transmitting a CTS after a device receives an RTS may be redefined. For example, it is defined in the IEEE 802.11 system that an AP transmits the CTS after a predetermined time (e.g. a short inter-frame space (SIFS)) upon receiving the RTS from an STA. However, for RTS/CTS exchanging for sensing based UL MU-MIMO transmission of the present invention, the predetermined time may be redefined. Meanwhile, the CTS may be transmitted using one of the following schemes.

Alt1: multicast messaging
    Alt2: unicast messaging with different timings
    Alt3: unicast messaging with DL MU-MIMO transmission Alt1 is a scheme in which one packet is transmitted to all devices which have transmitted RTSs (e.g. there is a plurality of receiving device IDs or a receiving device ID is equal to a group ID). Alt2 is a scheme in which CTSs are separately configured and transmitted to devices which have transmitted RTSs with different timings. Alt3 is a scheme in which CTSs are separately configured for devices which have transmitted RTSs but the CTSs for the devices are simultaneously transmitted on the same medium using DL MU-MIMO transmission. In Alt1, Alt2, and Alt3, the frame formats of Table 1 and Table 2 may be used.

In this embodiment, upon transmitting CTSs to MU grouped devices for frequency and/or timing synchronization, the AP may transmit a frequency offset and/or a transmission timing offset to the device(s).

In this embodiment, a process in which device 2 which desires to participate in transmission transmits the RTS to the AP and a process in which the AP transmits the CTS to device 2 are not indispensable processes and may be omitted. For example, after sensing the RTS packet of device 1, device 2 may transmit a data packet thereof when device 1 transmits a data packet, without an RTS/CTS exchange procedure with the AP.

In this embodiment, device 2 may transmit information indicating that device 2 is to join a medium which is being occupied by device 1 to device 1. The above information may serve to simply provide information but may be provided to request device 1 to permit transmission. In the latter case, upon receiving transmission permission from device 1, device 2 performs UL transmission on the medium. Device 1 may provide device 2 with information necessary when device 2 adjusts time/frequency synchronization therewith together with transmission permission.

Figure 11:
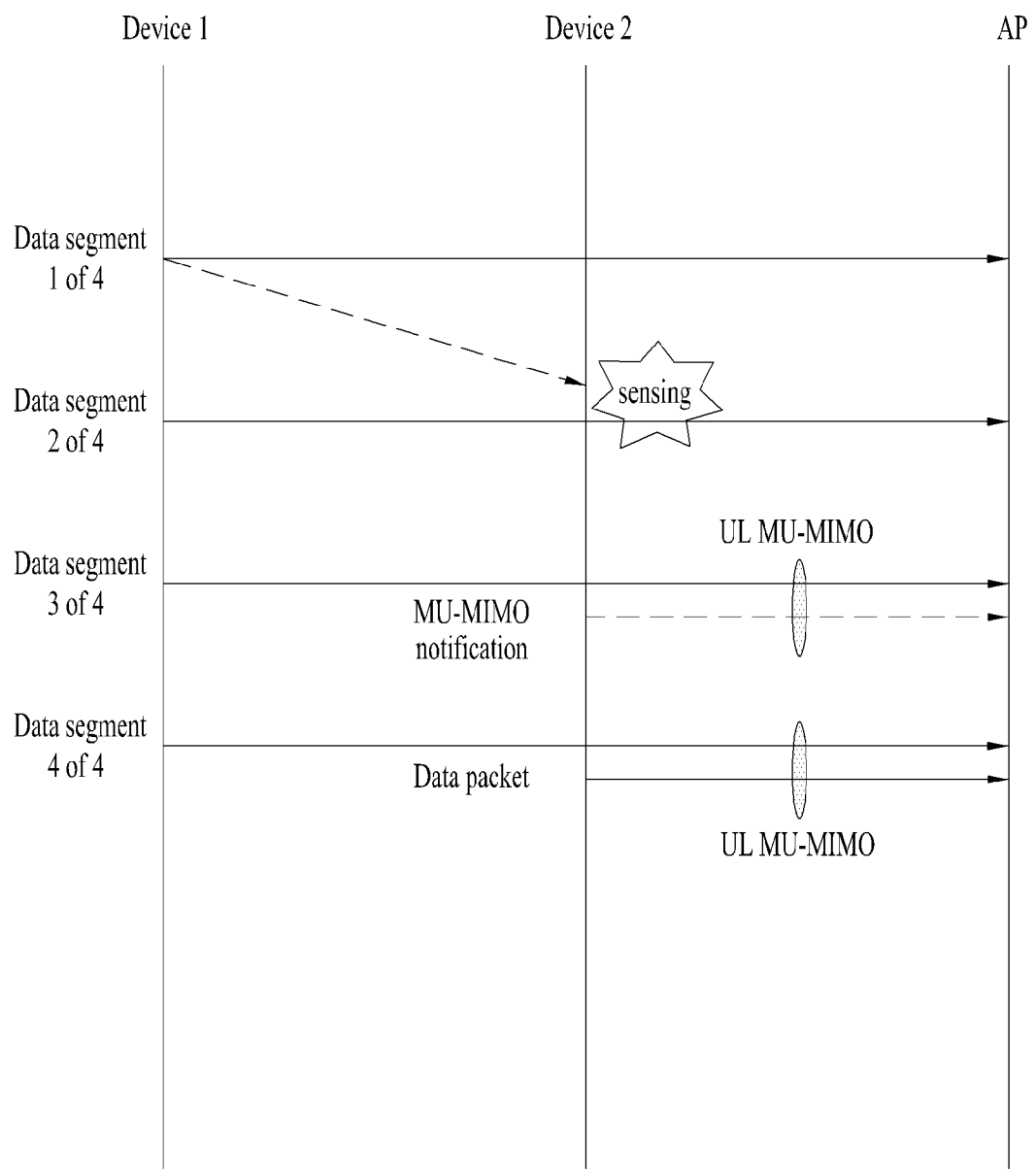
FIG. 11 illustrates sensing based MU-MIMO transmission according to still another embodiment of the present invention.

FIG. 11 illustrates sensing based MU-MIMO transmission according to still another embodiment of the present invention.

In the IEEE 802.11 system, if a data packet is greater than a predetermined magnitude, the data packet may be split into a plurality of data segments of smaller size and then the data segments may be sequentially transmitted. Referring to FIG. 11, not only in the case in which an RTS packet of device 1 is sensed but also in the case in which the data packet is split, device 2 according to an embodiment of the present invention may sense such information and participate in a UL transmission process of device 1. For example, when the data packet has been split and a sensed packet is a data segment within a specific order among a plurality of data segments of the data packet, it may be defined that device 2 is permitted to participate in UL transmission of device 1. In this case, device 2 may participate in UL transmission after transmitting information indicating that itself will start UL transmission by participating in UL transmission of device 1 (MU-MIMO notification packet of FIG. 11) to the AP or may immediately participate in MU-MIMO transmission by omitting transmission of the MU-MIMO notification packet. The MU-MIMO notification packet may include information such as an ID of a device which desires to participate in transmission (device 2 of FIG. 11) and data transmission quantity.

A device based on the embodiment of FIG. 10 and/or the embodiment of FIG. 11 performs UL transmission by joining a medium occupied by another device when the following conditions are satisfied.

Condition C. Type of a sensed packet is an RTS packet or a segment within a specific order among segments of a split data packet Condition C may be used together with Condition A and Condition B. In other words, a device according to an embodiment of the present invention may perform UL transmission by joining a medium occupied by another device when Condition A, Condition B, and Condition C are satisfied.

Meanwhile, a condition for time/frequency synchronization may be added to "Condition A and Condition B" and/or "Condition C". For example, device 2 may be regulated to perform UL MU-MIMO transmission only when a frequency offset of a sensed packet is within a specific error range compared with a frequency offset of a packet transmitted thereby. If device 2 is not aware of frequency offset characteristics thereof, it may be regulated that device 2 is permitted to join a medium occupied by another device when an absolute value of the frequency offset of the sensed packet is within a specific error range instead of comparing with the frequency offset of the transmission packet thereof. Alternatively, since device 2 may adjust the frequency offset thereof with a frequency offset of another device which is transmitting a packet on a corresponding medium by applying the above-proposed sensing based frequency synchronization scheme, it may be regulated that device 2 is permitted to perform MU-MIMO transmission only when a frequency offset of the sensed packet is within a frequency offset range which can be corrected by a device which desires to participate in UL transmission of another device. In summary, a device according to an embodiment of the present invention may perform UL transmission by joining a medium occupied by another device when the following condition is satisfied together with "Condition A and Condition B" and/or "Condition C".

Condition D. Frequency offset of a packet sensed by a device is:
  Alt1. within a specific error range;
  Alt2. within a specific error range compared with a frequency offset of the packet transmitted by the device; or
  Alt3. within a transmission frequency offset range which can be corrected by the device when a sensing based frequency synchronization scheme is applied.

Figure 12:
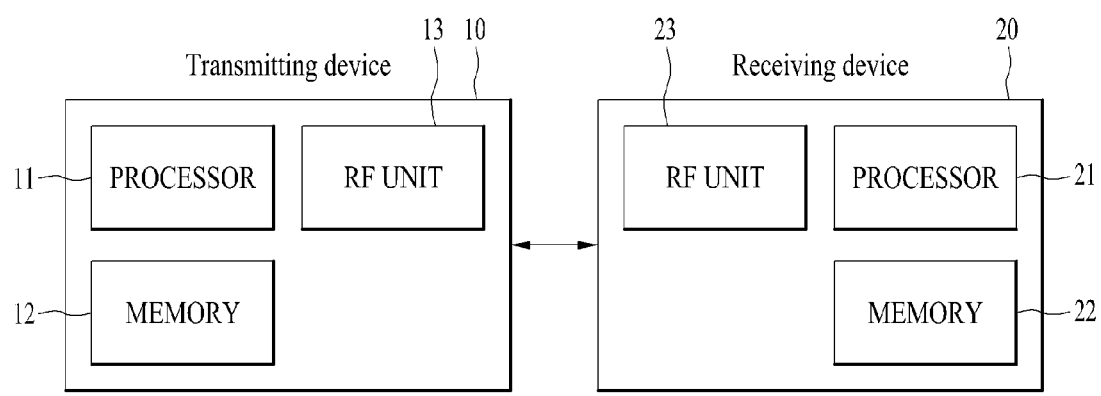
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a non-AP STA may operate as the transmitting device 10 in UL and as the receiving device 20 in DL. An AP STA may operate as the receiving device 20 in UL and as the transmitting device 10 in DL. In FIGS. 9 to 11, each of device 1 and device 2 operates as the transmitting device 10 and the AP operates as the receiving device 20. In FIGS. 9 to 11, device 1 and device 2 may be non-AP STAs. However, device 1 may be another AP STA which is transmitting a signal to the AP and device 2 may be a non-AP STA which desires to transmit a signal to the AP. Alternatively, device 1 may be a non-AP STA which is transmitting a signal to the AP, device 2 may be a non-AP STA which desires to transmit a signal to the AP, or both device 1 and device 2 may be AP STAs.

The processor 11 of the transmitting device 10 according to the embodiment of the present invention is configured to sense, using the RF unit 13, whether a medium is being used for signal transmission to the target receiving device 20 by another device, that is, whether the medium is being occupied by another transmitting device. The processor 11 may sense that the medium is already being used by another device by sensing a signal transmitted to the AP on the medium. The processor 11:

X. senses a medium to determine whether another transmitting device which is currently occupying the medium is capable of performing UL MU-MIMO transmission therewith and Y. If another transmitting device occupying the medium is not capable of performing UL MU-MIMO transmission, waits until the medium is empty and, otherwise, controls the RF unit 13 to perform UL MU-MIMO transmission on the medium.

Referring to FIG. 8, for example, when device 1 present at location (A, 1) transmits a signal to an AP, the processor 11 of the transmitting device 10 present at location (B, 4) may be configured to:

(1) control the RF unit 13 to sense the signal transmitted by device 1;

(2) determine whether UL MU-MIMO transmission with device 1 can be performed, that is, whether to pair with device 1; and (3) control the RF unit to perform UL transmission by joining a medium occupied by device 1 when it is determined that UL MU-MIMO transmission with device 1 can be performed.

In process (1), the processor 11 may receive a packet header on a medium occupied by another transmitting device to sense whether the transmitting device 10 transmits a signal to the same receiving device as the receiving device 20 to which the transmitting device 10 transmits the signal on the medium. The processor 11 may be configured to acquire one or more of the following information from the packet received by the RF unit on the medium.

a. transmitting device ID
b. receiving device ID
c. type or use of a packet
d. time/frequency synchronization information In process (2), the processor 11 may be configured to determine whether to join a medium on which another transmitting device is transmitting a signal, by using the information obtained in process (1) (e.g. at least one of "a" to "d").

In process (3), the processor 11 may adjust packet transmission timing and frequency synchronization of the transmitting device 10 with packet transmission timing and frequency synchronization of another device which has occupied a medium first and control the RF unit 13 to transmit a signal on the medium.

The processor 11 may perform frequency synchronization out of time synchronization and frequency synchronization according to a sensing based frequency synchronization scheme in accordance with an embodiment of the present invention. The processor 11 may be configured to overhear a packet or signal which is being transmitted by another transmitting device using the RF unit 13 and acquire a frequency offset of another transmitting device from the sensed packet or signal. The processor 11 may be configured to adjust a frequency offset of the transmitting device 10 based on the acquired frequency offset. The processor 11 may control the RF unit 13 to transmit a data packet or signal on a medium on which another transmitting device is transmitting a signal, based on the adjusted frequency characteristics.

As another example, the processor 11 may be configured to perform time and frequency synchronization according to synchronization information for time and frequency synchronization provided by an AP or the receiving device 20 or according to synchronization information preset in a system.

Let's assume that, in relation to time synchronization, another transmitting device is device 1, the transmitting device 10 is device 2, the receiving device 20 is device 3, and a propagation delay between devices "x" and "y" is $d_{xy}$. The processor 11 adjusts a time when a packet of another transmitting device reaches the receiving device 20 and a time when a packet of the transmitting device 10 reaches the receiving device 20 by controlling the RF unit 13 to transmit a signal faster than another transmitting device by "$d_{23}-d_{13}$".

When judging whether another transmitting device currently occupying a medium in process (1) is a device which can perform UL MU-MIMO transmission with the transmitting device 10, the processor 11 may be configured to consider whether frequency synchronization of the transmitting device 10 is equal to frequency synchronization of another transmitting device. If frequencies of the two devices are synchronized, the processor 11 may control the RF unit 13 to transmit a signal on a medium occupied by another transmitting device.

In the meantime, when a UL packet timing can be synchronized based on a specific reference packet from an AP, that is, all devices are synchronized by an absolute transmission timing offset, the processor 11 may be configured to determine a timing offset for each device regardless of MU grouping (i.e. MU pairing).

In the above-described embodiments of the present invention, the processor 11 may control the RF unit 13 to transmit, to another transmitting device currently occupying a medium, information indicating that a signal is being transmitted or will be transmitted on the medium. In addition, the processor 11 may control the RF unit 13 to transmit information as to whether UL MU-MIMO transmission is performed (started) to another transmitting device.

Meanwhile, the processor 11 may control the RF unit 13 to perform UL transmission by joining a medium occupied by another device when the following conditions are satisfied.

Condition A. transmitting device ID∈MU group
Condition B. receiving device ID∈ID of target AP However, the processor 11 may control the RF unit 13 to perform UL transmission by joining an already occupied medium only when a sensed packet corresponds to a specific packet type.

The processor 11 may also control the RF unit to perform UL transmission on a medium occupied by another transmitting device only when an RTS packet transmitted from another transmitting device to the receiving device 20 is sensed.

In this embodiment, for frequency and/or timing synchronization, the processor 21 of the receiving device 20 may be configured to control the RF unit 23 to transmit a CTS to MU grouped devices and to transmit a frequency offset and/or a transmission timing offset to the grouped device(s) during transmission of the CTSs.

Meanwhile, the processor 11 may control the RF unit 13 to perform UL transmission by joining a medium occupied by another transmitting device when the following condition is satisfied.

Condition C. Type of a sensed packet is an RTS packet or a segment within a specific order among segments of a split data packet Condition C may be used together with Condition A and Condition B.

The processor 11 may additionally consider a time/frequency synchronization condition together with "Condition A and Condition B" and/or "Condition C". For example, the processor 11 may control the RF unit 13 to perform UL transmission by joining a medium occupied by another device when the following condition is satisfied together with "Condition A and Condition B" and/or "Condition C".

Condition D. Frequency offset of a packet sensed by a device is:
Alt1. within a specific error range;
Alt2. within a specific error range compared with a frequency offset of the packet transmitted by the device; or
Alt3. within a transmission frequency offset range which can be corrected by the device when a sensing based frequency synchronization scheme is applied.

According to the embodiments of the present invention, while receiving a signal from a certain transmitting device on a medium, the RF unit 23 of the receiving device 20 receives a signal from another transmitting device together with the signal transmitted by the certain transmitting device.

According to the embodiments of the present invention UL frequency synchronization can be efficiently performed in a CSMA based system.

According to the embodiments of the present invention, UL MU-MIMO transmission can be efficiently performed.

According to the embodiments of the present invention, UL data throughput can be improved.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an access point, a station, a relay, a user equipment, and other devices in a wireless communication system.

The invention claimed is:

1. A method for transmitting an uplink signal to an access point (AP) by a station (STA) in a wireless local area network (WLAN), the method comprising:

sensing, by the STA, that a channel is occupied by another STA by sensing an uplink signal of the another STA transmitted to the AP on the channel;

acquiring, by the STA, information based on the sensed uplink signal of the another STA, the acquired information comprising at least one of:
identifier information of the another STA,
identifier information of the AP,
a type of the uplink signal of the another STA, or
time/frequency synchronization information with the another STA; and transmitting, by the STA based on the acquired information, an uplink signal of the STA to the AP on the channel currently occupied by the another STA.

2. The method according to claim 1, wherein the uplink signal of the STA is transmitted in synchronization with a frequency and a signal transmission timing of the another STA.

3. The method according to claim 2, wherein the uplink signal of the STA is transmitted on the channel currently occupied by the another STA when a frequency offset of the sensed uplink signal of the another STA is within a predetermined error range.

4. The method according to claim 1, wherein the uplink signal of the STA is transmitted on the channel currently occupied by the another STA when the sensed uplink signal of the another STA is a request-to-send (RTS) packet of the another STA or is a data segment within a specific order among data segments of the another STA.

5. A station (STA) for transmitting an uplink signal to an access point (AP) in a wireless local area network (WLAN), the STA comprising:

a radio frequency (RF) unit; and
a processor configured to control the RF unit,
wherein the processor is configured to
sense that a channel is occupied by another STA by control the RF unit to sense an uplink signal of the another STA transmitted to the AP on the channel channel,
acquire information based on the sensed uplink signal of the another STA, the acquired information comprising at least one of:
identifier information of the another STA,
identifier information of the AP,
a type of the uplink signal of the another STA, or
time/frequency synchronization information with the another STA; and
control the RF unit to transmit an uplink signal of the STA to the AP on the channel currently occupied by the another STA, based on the acquired information.

6. The STA according to claim 5, wherein the processor controls the RF unit to transmit the uplink signal of the STA in synchronization with a frequency and a signal transmission timing of the another STA.

7. The STA according to claim 6, wherein the processor controls the RF unit to transmit the uplink signal of the STA on the channel currently occupied by the another STA when a frequency offset of the sensed uplink signal of the another STA is within a predetermined error range.

8. The STA according to claim 5, wherein the processor controls the RF unit to transmit the uplink signal of the STA on the channel currently occupied by the another STA when the sensed uplink signal of the another STA is a request-to-send (RTS) packet of the another STA or is a data segment within a specific order among data segments of the another STA.

* * * * *